United States Patent
Scheuermann et al.

(10) Patent No.: US 9,665,397 B2
(45) Date of Patent: *May 30, 2017

(54) HARDWARE TASK MANAGER

(71) Applicant: Sviral, Inc., Palo Alto, CA (US)

(72) Inventors: W. James Scheuermann, Saratoga, CA (US); Eugene B. Hogenauer, San Carlos, CA (US)

(73) Assignee: Cornami, Inc., Sunnyvale, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/331,741

(22) Filed: Jul. 15, 2014

(65) Prior Publication Data
US 2014/0331231 A1    Nov. 6, 2014

Related U.S. Application Data

(63) Continuation of application No. 13/493,216, filed on Jun. 11, 2012, now Pat. No. 8,782,196, which is a continuation of application No. 12/367,690, filed on Feb. 9, 2009, now Pat. No. 8,200,799, which is a continuation of application No. 10/443,501, filed on May 21, 2003, now Pat. No. 7,653,710.

(60) Provisional application No. 60/391,874, filed on Jun. 25, 2002.

(51) Int. Cl.
*G06F 9/48* (2006.01)
*G06F 9/52* (2006.01)
*G06F 15/173* (2006.01)

(52) U.S. Cl.
CPC .............. *G06F 9/4881* (2013.01); *G06F 9/52* (2013.01); *G06F 15/17331* (2013.01)

(58) Field of Classification Search
CPC ..... G06F 9/52; G06F 9/4881; G06F 15/17331
See application file for complete search history.

(56) References Cited

U.S. PATENT DOCUMENTS

| | | |
|---|---|---|
| RE30,301 E | 6/1980 | Zygiel |
| RE32,179 E | 6/1986 | Sedam et al. |
| 4,713,755 A | 12/1987 | Worley, Jr. et al. |
| 4,719,056 A | 1/1988 | Scott |

(Continued)

FOREIGN PATENT DOCUMENTS

| | | |
|---|---|---|
| DE | 100 18 374 A1 | 10/2001 |
| EP | 0 301 169 A1 | 2/1989 |

(Continued)

OTHER PUBLICATIONS

Abnoet al., "Ultra-Low-Power Domain-Specific Multimedia Processors," VLSI Signal Processing, IX, 1998, IEEE Workshop in San Francisco, CA, USA, Oct. 30-Nov. 1, 1998, pp. 461-470 (Oct. 30, 1998).

(Continued)

*Primary Examiner* — Larry Donaghue
(74) *Attorney, Agent, or Firm* — Nixon Peabody LLP

(57) ABSTRACT

A hardware task manager for an adaptive computing system. The adaptive computing system includes a plurality of computing nodes including an execution unit configured to execute tasks. An interconnection network is operatively coupled to the plurality of computing nodes to provide interconnections among the plurality of computing nodes. The hardware task manager manages execution of the tasks by the execution unit.

17 Claims, 11 Drawing Sheets

(56) References Cited

U.S. PATENT DOCUMENTS

| | | |
|---|---|---|
| 4,726,494 A | 2/1988 | Scott |
| 4,747,516 A | 5/1988 | Baker |
| 4,748,585 A | 5/1988 | Chiarulli et al. |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,901,887 A | 2/1990 | Burton |
| 4,921,315 A | 5/1990 | Metcalfe et al. |
| 4,930,666 A | 6/1990 | Rudick |
| 4,932,564 A | 6/1990 | Austin et al. |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,129,549 A | 7/1992 | Austin |
| 5,139,708 A | 8/1992 | Scott |
| 5,156,301 A | 10/1992 | Hassell et al. |
| 5,156,871 A | 10/1992 | Goulet et al. |
| 5,165,575 A | 11/1992 | Scott |
| 5,190,083 A | 3/1993 | Gupta et al. |
| 5,190,189 A | 3/1993 | Zimmer et al. |
| 5,193,151 A | 3/1993 | Jain |
| 5,193,718 A | 3/1993 | Hassell et al. |
| 5,202,993 A | 4/1993 | Tarsy et al. |
| 5,203,474 A | 4/1993 | Haynes |
| 5,240,144 A | 8/1993 | Feldman |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,335,276 A | 8/1994 | Thompson et al. |
| 5,339,428 A | 8/1994 | Burmeister et al. |
| 5,343,716 A | 9/1994 | Swanson et al. |
| 5,361,362 A | 11/1994 | Benkeser et al. |
| 5,368,198 A | 11/1994 | Goulet |
| 5,379,343 A | 1/1995 | Grube et al. |
| 5,381,546 A | 1/1995 | Servi et al. |
| 5,381,550 A | 1/1995 | Jourdenais et al. |
| 5,388,212 A | 2/1995 | Grube et al. |
| 5,392,960 A | 2/1995 | Kendt et al. |
| 5,437,395 A | 8/1995 | Bull et al. |
| 5,450,557 A | 9/1995 | Kopp et al. |
| 5,454,406 A | 10/1995 | Rejret et al. |
| 5,465,368 A | 11/1995 | Davidson et al. |
| 5,479,055 A | 12/1995 | Eccles |
| 5,490,165 A | 2/1996 | Blakeney, II et al. |
| 5,491,823 A | 2/1996 | Ruttenberg |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A | 5/1996 | Sumimoto |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A | 9/1996 | Haddock |
| 5,570,587 A | 11/1996 | Kim |
| 5,572,572 A | 11/1996 | Kawan et al. |
| 5,590,353 A | 12/1996 | Sakakibara et al. |
| 5,594,657 A | 1/1997 | Cantone et al. |
| 5,600,810 A | 2/1997 | Ohkami |
| 5,600,844 A | 2/1997 | Shaw et al. |
| 5,602,833 A | 2/1997 | Zehavi |
| 5,603,043 A | 2/1997 | Taylor et al. |
| 5,607,083 A | 3/1997 | Vogel et al. |
| 5,608,643 A | 3/1997 | Wichter et al. |
| 5,611,867 A | 3/1997 | Cooper et al. |
| 5,623,545 A | 4/1997 | Childs et al. |
| 5,625,669 A | 4/1997 | McGregor et al. |
| 5,626,407 A | 5/1997 | Westcott |
| 5,630,206 A | 5/1997 | Urban et al. |
| 5,635,940 A | 6/1997 | Hickman et al. |
| 5,646,544 A | 7/1997 | Iadanza |
| 5,646,545 A | 7/1997 | Trimberger et al. |
| 5,647,512 A | 7/1997 | Assis Mascarenhas deOliveira et al. |
| 5,667,110 A | 9/1997 | McCann et al. |
| 5,684,793 A | 11/1997 | Kiema et al. |
| 5,684,980 A | 11/1997 | Casselman |
| 5,687,236 A | 11/1997 | Moskowitz et al. |
| 5,694,613 A | 12/1997 | Suzuki |
| 5,694,794 A | 12/1997 | Jerg et al. |
| 5,699,328 A | 12/1997 | Ishizaki et al. |
| 5,701,482 A | 12/1997 | Harrison et al. |
| 5,704,053 A | 12/1997 | Santhanam |
| 5,706,191 A | 1/1998 | Bassett et al. |
| 5,706,976 A | 1/1998 | Purkey |
| 5,712,996 A | 1/1998 | Schepers |
| 5,720,002 A | 2/1998 | Wang |
| 5,721,693 A | 2/1998 | Song |
| 5,721,854 A | 2/1998 | Ebcioglu et al. |
| 5,732,563 A | 3/1998 | Bethuy et al. |
| 5,734,808 A | 3/1998 | Takeda |
| 5,737,631 A | 4/1998 | Trimberger |
| 5,742,180 A | 4/1998 | DeHon et al. |
| 5,742,821 A | 4/1998 | Prasanna |
| 5,745,366 A | 4/1998 | Higham et al. |
| RE35,780 E | 5/1998 | Hassell et al. |
| 5,751,295 A | 5/1998 | Becklund et al. |
| 5,754,227 A | 5/1998 | Fukuoka |
| 5,758,261 A | 5/1998 | Wiedeman |
| 5,768,561 A | 6/1998 | Wise |
| 5,778,439 A | 7/1998 | Trimberger et al. |
| 5,784,636 A | 7/1998 | Rupp |
| 5,787,237 A | 7/1998 | Reilly |
| 5,790,817 A | 8/1998 | Asghar et al. |
| 5,791,517 A | 8/1998 | Avital |
| 5,791,523 A | 8/1998 | Oh |
| 5,794,062 A | 8/1998 | Baxter |
| 5,794,067 A | 8/1998 | Kadowaki |
| 5,802,055 A | 9/1998 | Krein et al. |
| 5,818,603 A | 10/1998 | Motoyama |
| 5,822,308 A | 10/1998 | Weigand et al. |
| 5,822,313 A | 10/1998 | Malek et al. |
| 5,822,360 A | 10/1998 | Lee et al. |
| 5,828,858 A | 10/1998 | Athanas et al. |
| 5,829,085 A | 11/1998 | Jerg et al. |
| 5,835,753 A | 11/1998 | Witt |
| 5,838,165 A | 11/1998 | Chatter |
| 5,845,815 A | 12/1998 | Vogel |
| 5,860,021 A | 1/1999 | Klingman |
| 5,862,961 A | 1/1999 | Motta et al. |
| 5,870,427 A | 2/1999 | Tiedemann, Jr. et al. |
| 5,873,045 A | 2/1999 | Lee et al. |
| 5,881,106 A | 3/1999 | Cartier |
| 5,884,284 A | 3/1999 | Peters et al. |
| 5,886,537 A | 3/1999 | Macias et al. |
| 5,887,174 A | 3/1999 | Simons et al. |
| 5,889,816 A | 3/1999 | Agrawal et al. |
| 5,890,014 A | 3/1999 | Long |
| 5,892,900 A | 4/1999 | Ginter et al. |

(56) References Cited

U.S. PATENT DOCUMENTS

| | | |
|---|---|---|
| 5,892,961 A | 4/1999 | Trimberger |
| 5,894,473 A | 4/1999 | Dent |
| 5,901,884 A | 5/1999 | Goulet et al. |
| 5,903,886 A | 5/1999 | Heimlich et al. |
| 5,907,285 A | 5/1999 | Toms et al. |
| 5,907,580 A | 5/1999 | Cummings |
| 5,910,733 A | 6/1999 | Bertolet et al. |
| 5,912,572 A | 6/1999 | Graf, III |
| 5,913,172 A | 6/1999 | McCabe et al. |
| 5,917,852 A | 6/1999 | Butterfield et al. |
| 5,920,801 A | 7/1999 | Thomas et al. |
| 5,931,918 A | 8/1999 | Row et al. |
| 5,933,642 A | 8/1999 | Greenbaum et al. |
| 5,940,438 A | 8/1999 | Poon et al. |
| 5,949,415 A | 9/1999 | Lin et al. |
| 5,950,011 A | 9/1999 | Albrecht et al. |
| 5,950,131 A | 9/1999 | Vilmur |
| 5,951,674 A | 9/1999 | Moreno |
| 5,953,322 A | 9/1999 | Kimball |
| 5,956,518 A | 9/1999 | DeHon et al. |
| 5,956,967 A | 9/1999 | Kim |
| 5,959,811 A | 9/1999 | Richardson |
| 5,959,881 A | 9/1999 | Trimberger et al. |
| 5,963,048 A | 10/1999 | Harrison et al. |
| 5,966,534 A | 10/1999 | Cooke et al. |
| 5,970,254 A | 10/1999 | Cooke et al. |
| 5,987,105 A | 11/1999 | Jenkins et al. |
| 5,987,611 A | 11/1999 | Freund |
| 5,991,302 A | 11/1999 | Berl et al. |
| 5,991,308 A | 11/1999 | Fuhrmann et al. |
| 5,993,739 A | 11/1999 | Lyon |
| 5,999,734 A | 12/1999 | Willis et al. |
| 6,005,943 A | 12/1999 | Cohen et al. |
| 6,006,249 A | 12/1999 | Leong |
| 6,016,395 A | 1/2000 | Mohamed |
| 6,021,186 A | 2/2000 | Suzuki et al. |
| 6,021,492 A | 2/2000 | May |
| 6,023,742 A | 2/2000 | Ebeling et al. |
| 6,023,755 A | 2/2000 | Casselman |
| 6,028,610 A | 2/2000 | Deering |
| 6,036,166 A | 3/2000 | Olson |
| 6,039,219 A | 3/2000 | Bach et al. |
| 6,041,322 A | 3/2000 | Meng et al. |
| 6,041,970 A | 3/2000 | Vogel |
| 6,046,603 A | 4/2000 | New |
| 6,047,115 A | 4/2000 | Mohan et al. |
| 6,052,600 A | 4/2000 | Fette et al. |
| 6,055,314 A | 4/2000 | Spies et al. |
| 6,056,194 A | 5/2000 | Kolls |
| 6,059,840 A | 5/2000 | Click, Jr. |
| 6,061,580 A | 5/2000 | Altschul et al. |
| 6,073,132 A | 6/2000 | Gehman |
| 6,076,174 A | 6/2000 | Freund |
| 6,078,736 A | 6/2000 | Guccione |
| 6,085,740 A | 7/2000 | Ivri et al. |
| 6,088,043 A | 7/2000 | Kelleher et al. |
| 6,091,263 A | 7/2000 | New et al. |
| 6,091,765 A | 7/2000 | Pietzold, III et al. |
| 6,094,065 A | 7/2000 | Tavana et al. |
| 6,094,726 A | 7/2000 | Gonion et al. |
| 6,111,893 A | 8/2000 | Volftsun et al. |
| 6,111,935 A | 8/2000 | Hughes-Hartogs |
| 6,115,751 A | 9/2000 | Tam et al. |
| 6,120,551 A | 9/2000 | Law et al. |
| 6,122,670 A | 9/2000 | Bennett et al. |
| 6,128,307 A | 10/2000 | Brown |
| 6,138,693 A | 10/2000 | Matz |
| 6,141,283 A | 10/2000 | Bogin et al. |
| 6,150,838 A | 11/2000 | Wittig et al. |
| 6,154,494 A | 11/2000 | Sugahara et al. |
| 6,157,997 A | 12/2000 | Oowaki et al. |
| 6,175,854 B1 | 1/2001 | Bretscher |
| 6,175,892 B1 | 1/2001 | Sazzad et al. |
| 6,181,981 B1 | 1/2001 | Varga et al. |
| 6,185,418 B1 | 2/2001 | MacLellan et al. |
| 6,192,070 B1 | 2/2001 | Poon et al. |
| 6,192,255 B1 | 2/2001 | Lewis et al. |
| 6,192,388 B1 | 2/2001 | Cajolet |
| 6,195,788 B1 | 2/2001 | Leaver et al. |
| 6,198,924 B1 | 3/2001 | Ishii et al. |
| 6,199,181 B1 | 3/2001 | Rechef et al. |
| 6,202,130 B1 | 3/2001 | Scales, III et al. |
| 6,219,697 B1 | 4/2001 | Lawande et al. |
| 6,219,756 B1 | 4/2001 | Kasamizugami |
| 6,219,780 B1 | 4/2001 | Lipasti |
| 6,223,222 B1 | 4/2001 | Fijolek et al. |
| 6,226,387 B1 | 5/2001 | Tewfik et al. |
| 6,230,307 B1 | 5/2001 | Davis et al. |
| 6,237,029 B1 | 5/2001 | Master et al. |
| 6,246,883 B1 | 6/2001 | Lee |
| 6,247,125 B1 | 6/2001 | Noel-Baron et al. |
| 6,249,251 B1 | 6/2001 | Chang et al. |
| 6,258,725 B1 | 7/2001 | Lee et al. |
| 6,263,057 B1 | 7/2001 | Silverman |
| 6,266,760 B1 | 7/2001 | DeHon et al. |
| 6,272,579 B1 | 8/2001 | Lentz et al. |
| 6,281,703 B1 | 8/2001 | Furuta et al. |
| 6,282,627 B1 | 8/2001 | Wong et al. |
| 6,289,375 B1 | 9/2001 | Knight et al. |
| 6,289,434 B1 | 9/2001 | Roy |
| 6,289,488 B1 | 9/2001 | Dave et al. |
| 6,292,822 B1 | 9/2001 | Hardwick |
| 6,292,827 B1 | 9/2001 | Raz |
| 6,292,830 B1 | 9/2001 | Taylor et al. |
| 6,301,653 B1 | 10/2001 | Mohamed et al. |
| 6,305,014 B1 | 10/2001 | Roediger et al. |
| 6,311,149 B1 | 10/2001 | Ryan et al. |
| 6,321,985 B1 | 11/2001 | Kolls |
| 6,346,824 B1 | 2/2002 | New |
| 6,347,346 B1 | 2/2002 | Taylor |
| 6,349,394 B1 | 2/2002 | Brock et al. |
| 6,353,841 B1 | 3/2002 | Marshall et al. |
| 6,356,863 B1 | 3/2002 | Sayle |
| 6,356,994 B1 | 3/2002 | Barry et al. |
| 6,359,248 B1 | 3/2002 | Mardi |
| 6,360,256 B1 | 3/2002 | Lim |
| 6,360,259 B1 | 3/2002 | Bradley |
| 6,360,263 B1 | 3/2002 | Kurtzberg et al. |
| 6,363,411 B1 | 3/2002 | Dugan et al. |
| 6,366,999 B1 | 4/2002 | Drabenstott et al. |
| 6,377,983 B1 | 4/2002 | Cohen et al. |
| 6,378,072 B1 | 4/2002 | Collins et al. |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor et al. |
| 6,411,612 B1 | 6/2002 | Halford et al. |
| 6,421,372 B1 | 7/2002 | Bierly et al. |
| 6,421,809 B1 | 7/2002 | Wuytack et al. |
| 6,430,624 B1 | 8/2002 | Jamtgaard et al. |
| 6,433,578 B1 | 8/2002 | Wasson |
| 6,434,590 B1 | 8/2002 | Blelloch et al. |
| 6,438,737 B1 | 8/2002 | Morelli et al. |
| 6,456,996 B1 | 9/2002 | Crawford, Jr. et al. |
| 6,459,883 B2 | 10/2002 | Subramanian et al. |
| 6,473,609 B1 | 10/2002 | Schwartz et al. |
| 6,507,947 B1 | 1/2003 | Schreiber et al. |
| 6,510,138 B1 | 1/2003 | Pannell |
| 6,510,510 B1 | 1/2003 | Garde |
| 6,538,470 B1 | 3/2003 | Langhammer et al. |
| 6,556,044 B2 | 4/2003 | Langhammer et al. |
| 6,563,891 B1 | 5/2003 | Eriksson et al. |
| 6,570,877 B1 | 5/2003 | Kloth et al. |
| 6,577,678 B2 | 6/2003 | Scheuermann |
| 6,587,684 B1 | 7/2003 | Hsu et al. |
| 6,590,415 B2 | 7/2003 | Agrawal et al. |
| 6,601,086 B1 | 7/2003 | Howard et al. |
| 6,601,158 B1 | 7/2003 | Abbott et al. |
| 6,604,085 B1 | 8/2003 | Kolls |
| 6,606,529 B1 | 8/2003 | Crowder, Jr. et al. |
| 6,615,333 B1 | 9/2003 | Hoogerbrugge et al. |
| 6,618,434 B2 | 9/2003 | Heidari-Bateni et al. |
| 6,640,304 B2 | 10/2003 | Ginter et al. |

(56) References Cited

U.S. PATENT DOCUMENTS

| | | |
|---|---|---|
| 6,653,859 B2 | 11/2003 | Sihlbom et al. |
| 6,675,265 B2 | 1/2004 | Barroso et al. |
| 6,691,148 B1 | 2/2004 | Zinky et al. |
| 6,711,617 B1 | 3/2004 | Bantz et al. |
| 6,718,182 B1 | 4/2004 | Kung |
| 6,721,286 B1 | 4/2004 | Williams et al. |
| 6,721,884 B1 | 4/2004 | De Oliveira Kastrup Pereira et al. |
| 6,732,354 B2 | 5/2004 | Ebeling et al. |
| 6,735,621 B1 | 5/2004 | Yoakum et al. |
| 6,738,744 B2 | 5/2004 | Kirovski et al. |
| 6,748,360 B2 | 6/2004 | Pitman et al. |
| 6,754,470 B2 | 6/2004 | Hendrickson et al. |
| 6,760,587 B2 | 7/2004 | Holtzman et al. |
| 6,766,165 B2 | 7/2004 | Sharma et al. |
| 6,778,212 B1 | 8/2004 | Deng et al. |
| 6,785,341 B2 | 8/2004 | Walton et al. |
| 6,819,140 B2 | 11/2004 | Yamanaka et al. |
| 6,823,448 B2 | 11/2004 | Roth et al. |
| 6,829,633 B2 | 12/2004 | Gelfer et al. |
| 6,832,250 B1 | 12/2004 | Coons et al. |
| 6,836,839 B2 | 12/2004 | Master et al. |
| 6,865,664 B2 | 3/2005 | Budrovic et al. |
| 6,871,236 B2 | 3/2005 | Fishman et al. |
| 6,883,084 B1 | 4/2005 | Donohoe |
| 6,894,996 B2 | 5/2005 | Lee |
| 6,901,440 B1 | 5/2005 | Bimm et al. |
| 6,912,515 B2 | 6/2005 | Jackson et al. |
| 6,985,517 B2 | 1/2006 | Matsumoto et al. |
| 6,986,021 B2 | 1/2006 | Master et al. |
| 6,988,139 B1 | 1/2006 | Jervis et al. |
| 7,032,229 B1 | 4/2006 | Flores et al. |
| 7,044,741 B2 | 5/2006 | Leem |
| 7,082,456 B2 | 7/2006 | Mani-Meitav et al. |
| 7,139,910 B1 | 11/2006 | Ainsworth et al. |
| 7,142,731 B1 | 11/2006 | Toi |
| 7,249,242 B2 | 7/2007 | Ramchandran |
| 7,433,909 B2 | 10/2008 | Scheuermann |
| 7,620,678 B1 | 11/2009 | Master et al. |
| 7,653,710 B2 * | 1/2010 | Scheuermann ........... G06F 9/52 709/223 |
| 8,200,799 B2 * | 6/2012 | Scheuermann ........... G06F 9/52 709/223 |
| 8,782,196 B2 * | 7/2014 | Scheuermann ........... G06F 9/52 709/223 |
| 2001/0003191 A1 | 6/2001 | Kovacs et al. |
| 2001/0023482 A1 | 9/2001 | Wray |
| 2001/0029515 A1 | 10/2001 | Mirsky |
| 2001/0034795 A1 | 10/2001 | Moulton et al. |
| 2001/0039654 A1 | 11/2001 | Miyamoto |
| 2001/0048713 A1 | 12/2001 | Medlock et al. |
| 2001/0048714 A1 | 12/2001 | Jha |
| 2001/0050948 A1 | 12/2001 | Ramberg et al. |
| 2002/0010848 A1 | 1/2002 | Kamano et al. |
| 2002/0013799 A1 | 1/2002 | Blaker |
| 2002/0013937 A1 | 1/2002 | Ostanevich et al. |
| 2002/0015435 A1 | 2/2002 | Rieken |
| 2002/0015439 A1 | 2/2002 | Kohli et al. |
| 2002/0023210 A1 | 2/2002 | Tuomenoksa et al. |
| 2002/0024942 A1 | 2/2002 | Tsuneki et al. |
| 2002/0024993 A1 | 2/2002 | Subramanian et al. |
| 2002/0031166 A1 | 3/2002 | Subramanian et al. |
| 2002/0032551 A1 | 3/2002 | Zakiya |
| 2002/0035623 A1 | 3/2002 | Lawande et al. |
| 2002/0041581 A1 | 4/2002 | Aramaki |
| 2002/0042907 A1 | 4/2002 | Yamanaka et al. |
| 2002/0061741 A1 | 5/2002 | Leung et al. |
| 2002/0069282 A1 | 6/2002 | Reisman |
| 2002/0072830 A1 | 6/2002 | Hunt |
| 2002/0078337 A1 | 6/2002 | Moreau et al. |
| 2002/0083305 A1 | 6/2002 | Renard et al. |
| 2002/0083423 A1 | 6/2002 | Ostanevich et al. |
| 2002/0087829 A1 | 7/2002 | Snyder et al. |
| 2002/0089348 A1 | 7/2002 | Langhammer |
| 2002/0101909 A1 | 8/2002 | Chen et al. |
| 2002/0107905 A1 | 8/2002 | Roe et al. |
| 2002/0107962 A1 | 8/2002 | Richter et al. |
| 2002/0119803 A1 | 8/2002 | Bitterlich et al. |
| 2002/0120672 A1 | 8/2002 | Butt et al. |
| 2002/0138716 A1 | 9/2002 | Master et al. |
| 2002/0141489 A1 | 10/2002 | Imaizumi |
| 2002/0147845 A1 | 10/2002 | Sanchez-Herrero et al. |
| 2002/0159503 A1 | 10/2002 | Ramachandran |
| 2002/0162026 A1 | 10/2002 | Neuman et al. |
| 2002/0168018 A1 | 11/2002 | Scheuermann |
| 2002/0181559 A1 | 12/2002 | Heidari-Bateni et al. |
| 2002/0184291 A1 | 12/2002 | Hogenauer |
| 2002/0184498 A1 | 12/2002 | Qi |
| 2002/0191790 A1 | 12/2002 | Anand et al. |
| 2003/0007606 A1 | 1/2003 | Suder et al. |
| 2003/0012270 A1 | 1/2003 | Zhou et al. |
| 2003/0018446 A1 | 1/2003 | Makowski et al. |
| 2003/0018700 A1 | 1/2003 | Giroti et al. |
| 2003/0023830 A1 | 1/2003 | Hogenauer |
| 2003/0026242 A1 | 2/2003 | Jokinen et al. |
| 2003/0030004 A1 | 2/2003 | Dixon et al. |
| 2003/0046421 A1 | 3/2003 | Horvitz et al. |
| 2003/0061260 A1 | 3/2003 | Rajkumar |
| 2003/0061311 A1 | 3/2003 | Lo |
| 2003/0063656 A1 | 4/2003 | Rao et al. |
| 2003/0076815 A1 | 4/2003 | Miller et al. |
| 2003/0099223 A1 | 5/2003 | Chang et al. |
| 2003/0102889 A1 | 6/2003 | Master et al. |
| 2003/0105949 A1 | 6/2003 | Master et al. |
| 2003/0110485 A1 | 6/2003 | Lu et al. |
| 2003/0142818 A1 | 7/2003 | Raghunathan et al. |
| 2003/0154357 A1 | 8/2003 | Master et al. |
| 2003/0163507 A1 | 8/2003 | Chang et al. |
| 2003/0163723 A1 | 8/2003 | Kozuch et al. |
| 2003/0172138 A1 | 9/2003 | McCormack et al. |
| 2003/0172139 A1 | 9/2003 | Srinivasan et al. |
| 2003/0200538 A1 | 10/2003 | Ebeling et al. |
| 2003/0212684 A1 | 11/2003 | Meyer et al. |
| 2004/0006584 A1 | 1/2004 | Vandeweerd |
| 2004/0010645 A1 | 1/2004 | Scheuermann et al. |
| 2004/0015970 A1 | 1/2004 | Scheuermann |
| 2004/0025159 A1 | 2/2004 | Scheuermann et al. |
| 2004/0057505 A1 | 3/2004 | Valio |
| 2004/0062300 A1 | 4/2004 | McDonough et al. |
| 2004/0081248 A1 | 4/2004 | Parolari |
| 2004/0093479 A1 | 5/2004 | Ramchandran |
| 2004/0168044 A1 | 8/2004 | Ramchandran |
| 2005/0166038 A1 | 7/2005 | Wang et al. |
| 2005/0198199 A1 | 9/2005 | Dowling |
| 2006/0031660 A1 | 2/2006 | Master et al. |
| 2009/0282408 A1 | 11/2009 | Joffe et al. |

FOREIGN PATENT DOCUMENTS

| | | |
|---|---|---|
| EP | 0 166 586 B1 | 1/1991 |
| EP | 0 236 633 B1 | 5/1991 |
| EP | 0 478 624 B1 | 4/1992 |
| EP | 0 479 102 A2 | 4/1992 |
| EP | 0 661 831 A2 | 7/1995 |
| EP | 0 668 659 A2 | 8/1995 |
| EP | 0 690 588 A2 | 1/1996 |
| EP | 0 691 754 A2 | 1/1996 |
| EP | 0 768 602 A2 | 4/1997 |
| EP | 0 817 003 A2 | 1/1998 |
| EP | 0 821 495 A2 | 1/1998 |
| EP | 0 866 210 A2 | 9/1998 |
| EP | 0 923 247 A2 | 6/1999 |
| EP | 0 926 596 A2 | 6/1999 |
| EP | 1 056 217 A2 | 11/2000 |
| EP | 1 061 437 A1 | 12/2000 |
| EP | 1 061 443 A2 | 12/2000 |
| EP | 1 126 368 A2 | 8/2001 |
| EP | 1 150 506 A2 | 10/2001 |
| EP | 1 189 358 A1 | 3/2002 |
| GB | 2 067 800 A | 7/1981 |
| GB | 2 237 908 A | 5/1991 |
| JP | 62-249456 | 10/1987 |
| JP | 63-147258 | 6/1988 |
| JP | 4-51546 | 2/1992 |

(56) References Cited

FOREIGN PATENT DOCUMENTS

| | | |
|---|---|---|
| JP | 7-064789 | 3/1995 |
| JP | 7066718 | 3/1995 |
| JP | 10233676 | 9/1998 |
| JP | 10254696 | 9/1998 |
| JP | 11296345 | 10/1999 |
| JP | 2000315731 | 11/2000 |
| JP | 2001-053703 | 2/2001 |
| WO | WO 89/05029 A1 | 6/1989 |
| WO | WO 89/11443 A2 | 11/1989 |
| WO | WO 91/00238 A1 | 1/1991 |
| WO | WO 93/13603 A1 | 7/1993 |
| WO | WO 95/11855 A1 | 5/1995 |
| WO | WO 96/33558 A1 | 10/1996 |
| WO | WO 98/32071 A3 | 7/1998 |
| WO | WO 99/03776 A1 | 1/1999 |
| WO | WO 99/21094 A2 | 4/1999 |
| WO | WO 99/26860 A1 | 6/1999 |
| WO | WO 99/65818 A1 | 12/1999 |
| WO | WO 00/19311 A1 | 4/2000 |
| WO | WO 00/65855 A1 | 11/2000 |
| WO | WO 00/69073 A1 | 11/2000 |
| WO | WO 01/11281 A1 | 2/2001 |
| WO | WO 01/22235 A1 | 3/2001 |
| WO | WO 01/76129 A2 | 10/2001 |
| WO | WO 02/12978 A2 | 2/2002 |

OTHER PUBLICATIONS

Aggarwal et al.., "Efficient Huffman Decoding," International Conference on Image Processing IEEE 1:936-939 (Sep. 10-13, 2000).
Allan et al., "Software Pipelining," ACM Computing Surveys, 27(3):1-78 (Sep. 1995).
Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).
Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).
Bacon et al., "Compiler Transformations for High-Performance Computing," ACM Computing Surveys 26(4):368-373 (Dec. 1994).
Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).
Banerjee et al., "A MATLAB Compiler for Distributed, Heterogeneous, Reconfigurable Computing Systems," 2000 IEEE Symposium, pp. 39-48, (Apr. 17-19, 2000).
Bapte et al., "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 (1999).
Baumgarte et al., "PACT XPP—A Self-Reconfigurable Data Processing Architecture," NN www.pactcorp.com/sneu/download/ersa01.pdf; retrieved on Nov. 25, 2005 (Jun. 25, 2001).
Becker et al., "An Application-Tailored Dynamically Reconfigurable Hardware Architecture for Digital Baseband Processing," IEEE Conference Proceedings Article pp. 341-346 (Sep. 18, 2000).
Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).
Bevstar, BevStar Bottled Water Model Advertisement Automatic Merchandiser at www.AMonline.com (2005).
Bevstar, BevStar Point of Use Water Model Advertisement Automatic Merchandiser at www.AMonline.com (2005).

Bishop & Loucks, "A HeterogeneoEnvironment for Hardware/Software Cosimulation," Proceedings of the 30th Annual Simulation Symposium, pp. 14-22 (Apr. 7-9, 1997).
Brakensiek et al., "Re-Configurable Multi-Standard Terminal for HeterogeneoNetworks," Radio and Wireless Conference, Rawcon 2002 IEEE. pp. 27-30 (2002).
Brown et al., "Quick PDA Data Exchange," PC Magazine pp. 1-3 (May 22, 2001).
Buck et al., "Ptolemy: A Framework for Simulating and Prototyping HeterogeneoSystems," International Journal of Computer Simulation 4:155-182 (Apr. 1994).
Burns et al., "A Dynamic Reconfiguration Run-Time System," Proceedings of the 5th Annual Symposium on Field-Programmable Custom Computing Machines, pp. 166-175 (Apr. 16, 1997).
Business Wire, "Whirlpool Internet-Enabled Appliances to Use Beeline Shopper Software Features," http://www.whirlpoocorp.com/news/releases/release.asp?rid=90 (Feb. 16, 2001).
Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).
Callahan et al., "Adapting Software Pipelining for Reconfigurable Computing," in Proceedings of the International Conference on Compilers, Architectrue and Synthesis for Embedded Systems p. 8, ACM (CASES '00, San Jose, CA) (Nov. 17-18, 2000).
Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 (1998).
Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).
Clarke, "Embedded Solutions Enters Development Pact with Marconi," EETimes Online (Jan. 26, 2000).
Compton & Hauck, "Reconfigurable Computing: A Survey of Systems and Software," ACM Press, ACM Computing Surveys (CSUR) 34(2):171-210 (Jun. 2002).
Compton et al., "Configuration Relocation and Defragmentation for Run-Time Reconfigurable Computing," Northwestern University, http://citeseer.nj.nec.com/compton00configuration.html, pp. 1-17 (2000).
Conte et al., "Dynamic Rescheduling: A Technique for Object Code Compatibility in VLIW Architectures," Proceedings of the 28th Annulal International Symposium on Microarchitecture pp. 208-218 (Nov. 29, 1995).
Conte et al., "Instruction Fetch Mechanisms for VLIW Architectures with Compressed Encodings," Proceedings of the Annual IEEE/ACM International Symposium on Microarchitecture (MICRO) 29:201-211 (Dec. 2, 1996).
Cray Research Inc., "Cray T3E Fortran Optimization Guide," Ver. 004-2518-002, Section 4.5 (Jan. 1999).
Cummings et al., "FPGA in the Software Radio," IEEE Communications Magazine . 37(2):108-112 (Feb. 1999).
Dandalis et al., "An Adaptive Cryptograhic Engine for IPSec Architectures," IEEE pp. 132-141 (Jan. 2000).
David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).
Deepakumara et al., "FPGA Implementation of MD5 has Algorithm," Canadian Conference on Electrical and Computer Engineering, IEEE (2001).
Dehon et al., "Reconfigurable Computing: What, Why and Implications for Design Automation," Design Automation Conference Proceedings pp. 610-615 (1999).
Dipert, "Figuring Out Reconfigurable Logic," EDN 44(16):107-114 (Aug. 5, 1999).
Dominikus, "A Hardware Implementation of MD4-Family Hash Algorithms," 9th International Conference on Electronics, Circuits and Systems IEEE (2002).

(56) References Cited

OTHER PUBLICATIONS

Dorband, "aCe C Language Reference Guide," Online (Archived Mar. 2001), http://web.archive.org/web/20000616053819/http://newton.gsfc.nasa.gov/aCe/aCe_dir/aCe_cc_Ref.html (Mar. 2001).
Drozdowski, "Scheduling Multiprocessor Tasks—An Overview," Instytut Informatyki Politechnika, pp. 1-31 (Jan. 31, 1996).
Ebeling et al., "RaPiD Reconfigurable Pipelined Datapath," Springer-Verlag, 6th International Workshop on Field-Programmable Logic and Applications pp. 126-135 (1996).
Fawer et al., "A Multiprocessor Approach for Implementing a Time-Diversity Spread Specturm Receiver," Proceeding sof the 1990 International Zurich Seminal on Digital Communications, pp. 173-180 (Mar. 5-8, 1990).
Fisher, "Gone Flat," Forbes pp. 76-79 (Oct. 2001).
Fleischmann et al., "Prototyping Networked Embedded Systems," Integrated Engineering, pp. 116-119 (Feb. 1999).
Forbes "Best of the Web—Computer Networking/Consumer Durables," The Forbes Magnetic 40 p. 80 (May 2001).
Gibson, "Fresh Technologies Will Create Myriad Functions," FT Information Technology Review; World Wide Web at http://technews.acm.org/articles/2000-2/0301w.
html?searchterm=%22fresh+technologies%22 (Mar. 1, 2000).
Gluth, "Integrierte Signalprozessoren," Elektronik 35(18):112-118 Franzis Verlag GMBH, Munich, Germany (Sep. 5, 1986).
Gokhale & Schlesinger, "A Data Parallel C and Its Platforms," Proceedings of the Fifth Symposium on the Frontiers of Massively Parallel Computation pp. 194-202 (Frontiers '95) (Feb. 1995).
Grimm et al., "A System Architecture for Pervasive Computing," Washington University, pp. 1-6 (Sep. 2000).
Halbwachs et al., "The SynchronoData Flow Programming Language LUSTRE," Proceedings of the IEEE 79(9):1305-1319 (Sep. 1991).
Hammes et al., "Cameron: High Level Language Compilation for Reconfigurable Systems," Proc. of the Intl. Conf. on Parallel Architectures and Compilation Techniques, pp. 236-244 (Oct. 1999).
Hartenstein, "Coarse Grain Reconfigurable Architectures," Design Automation Conference, 2001. Proceedings of the ASP-Dac 2001, Asian and South Pacific Jan. 30, 2001-Feb. 2, 2001, Piscataway, NJ, US, IEEE, pp. 564-569 (Jan. 30, 2001).
Heinz, "An Efficiently Compilable Extension of {M}odula-3 for Problem-Oriented Explicitly Parallel Programming," Proceedings of the Joint Symposium on Parallel Processing (May 1993).
Hinden et al., "The DARPA Internet: Interconnecting HeterogeneoComputer Networks with Gateways," IEEE Computer Magazine pp. 38-48 (1983).
Horton, "Beginning Java 2: JDK 1.3 Edition," Wrox Press, Chapter 8, pp. 313-316 (Feb. 2001).
Huff et al., "Lifetime-Sensitive Modulo Scheduling," 6th Conference on Programming Language, Design and Implementation, pp. 258-267, ACM (1993).
IBM, "Multisequencing a Single Instruction Stream Scheduling with Space-time Trade-offs," IBM Technical Disclosure Bulletin 36(2):105-108 (Feb. 1, 1993).
IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).
Internet Wire, Sunbeam Joins Microsoft in University Plug and Play Forum to Establish a "Universal" Smart Appliance Technology Standard (Mar. 23, 2000).
Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).
Isoworth, "Isoworth Beverage Dispensing Technology Worldwide Company," Brochure (May 22, 2000).
Jain et al., "An Alternative Approach Towards the Design of Control Units," Microelectronics and Reliability 24(6):1009-1012 (1984).
Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).
Janssen et al., "Partitioned Register File for TTAs," Proceedings of the 28th Annual International Symposium on Microarchitecture, pp. 303-312 (Nov. 1995).
Jong-Pyng et al., "Real-Time Virtual Channel Flow Control," Proceedings of the Annual International Phoenix Conference on Computers and Communications, Conf. 13, pp. 97-103 (Apr. 12, 1994).
Jung et al., "Efficient Hardware Controller Synthesis for SynchronoDataflow Graph in System Level Design," Proceedings of the 13th International Symposium on System Synthesis pp. 79-84 (ISSS'00) (Sep. 2000).
Kaufmann et al., "Digital Spread-Spectrum Multipath-Diversity Receiver for Indoor Communication," from Pioneers to the 21st Century; Denver, Proceedings of the Vehicular Technology Socity [sic] Conference, NY, IEEE, 2(Conf. 42):1038-1041 (May 10-13, 1992).
Kneip et al., "An Algorithm Adapted AutonomoControlling Concept for a Parallel Single-Chip Digital Signal Processor," Journal of VLSI Signal Processing Systems for Signal, Image, an dVideo Technology 16(1):31-40 (May 1, 1997).
Lee & Messerschmitt, "Pipeline Interleaved Programmable DSP's: SynchronoData Flow Programming," IEEE Transactions on Acoustics, Speech, and Signal Processing ASSP—35(9):1334-1345 (Sep. 1987).
Lee & Messerschmitt, "SynchronoData Flow," Proceedings of the IEEE 75(9):1235-1245 (Sep. 1987).
Lee & Parks, "Dataflow Process Networks," Proceedings of the IEEE 83(5):773-799 (May 1995).
Liu et al., "Scheduling Algorithms for Multiprogramming in a Hard-Real-Time Environment," Journal of the Association for Computing 20(1):46-61 (1973).
Llosa et al., "Lifetime-Sensitive Modulo Scheduling in a Production Environment," IEEE Trans. on Comps. 50(3):234-249 (Mar. 2001).
Lu et al., "The Morphosys Dynamically Reconfigurable System-On-Chip," Proceedings of the First NASA/DOD Workshop on Evolvable Hardware, pp. 152-160 (Jul. 19, 1999).
Mangione-Smith et al., "Seeking Solutions in Configurable Computing," Computer 30(12):38-43 (Dec. 1997).
Manion, "Network CPU Adds Spice," Electronic Engineering Times, Issue 1126 (Aug. 14, 2000).
Mascia & Ishii., "Neural Net Implementation on Single-Chip Digital Signal Processor," IEEE (1989).
McGraw, "Parallel Functional Programming in Sisal: Fictions, Facts, and Future," Lawrence Livermore National Laboratory pp. 1-40 (Jul. 1993).
Najjar et al., "High-Level Language Abstraction for Reconfigurable Computing," Computer 36(8):63-69 (Aug. 2003).
Nichols et al., "Data Management and Control-Flow Constructs in a SIMD/SPMD Parallel Language/Compiler," Proceedings of the 3rd Symposium on the Frontiers of Massively Parallel Computation pp. 397-406 (Oct. 1990).
OpenMP Architecture Review Board, "OpenMP C and C++ Application Program Interface," pp. 7-16 (Oct. 1998).
Oracle Corporation, "Oracle8i JDBC Developer's Guide and Reference," Release 3, 8.1.7, pp. 10-8-10-10 (Jul. 2000).
Pauer et al., "Algorithm Analysis and Mapping Environment for Adaptive Computing Systems: Further Results," Proc. IEEE Symposium on FPGA's for Custom Computing Machines (FCCM), Napa CA (1999).
Pauer et al., "Algorithm Analysis and Mapping Environment for Adaptive Computing Systems," Presentation slides, Third Bi-annual Ptolemy Miniconference (1999).
Ramamritham et al., "On Scheduling Algorithms for Real-Time Multiprocessor Systems," Algorithms and Applications, Proceedings of the International conference on Parallel Processing 3:143-152 (Aug. 8, 1989).
Schneider, "A Parallel/Serial Trade-Off Methodology for Look-Up Table Based Decoders," Proceedings of the Design Automation Conference 34:498-503 (Jun. 9-13, 1997).

(56) References Cited

OTHER PUBLICATIONS

Sidhu et al., "A Self-Reconfigurable Gate Array Architecture," 10 International Workshop on Field Programmable Logic and Applications http://coblitz.codeen.org:3125/citeseer.ist.psu.edu/cache/papers/cs/17524/http:zSzzSzmaarcii.usc.eduzSzPublicationsZSzsidhu_fp100.pdf/sidhu00selfreconfigurable.pdf retrieved on Jun. 21, 2006 (Sep. 1, 2001).
Smith, "Intro to ASICs: ASIC Cell Libraries," at http://iroi.seu.edu.cn/books/asics/Book2/CH01/CH01.5.htm, printed on Feb. 4, 2005 (Jun. 1997).
Souza, "Computing's New Face—Reconfigurable Devices Could Rattle Supply Chain," Electronic Buyers' News Issue 1205, p. P.1 (Apr. 3, 2000).
Souza, "Quicksilver Buys White Eagle," Electronic Buyers News, Issue 1220 (Jul. 17, 2000).
Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).
Steiner, "Coke Chief's Latest Daft Idea—A Cola Tap in Every House," Sunday Times (Mar. 2001).
Sun Microsystems, "Fortran 3.0.1 User's Guide, Revision A," pp. 57-68 (Aug. 1994).
Svensson, "Co's Join on Home Web Wiring Network," Associated Press Online printed on Apr. 30, 2008 (Jun. 2000).
Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).
Vaya, "VITURBO: A Reconfigurable Architecture for UbiquitoWireless Networks," A Thesis Submitted in Partial Fulfillment of the Requirements for the Degree Master of Science; Rice University (Aug. 2002).
Wang et al., "Cell Search in W-CDMA," IEEE Journal on Selected Areas in Communications 18(8):1470-1482 (Aug. 2000).
Wardell, "Help for Hurried Cooks?," Popular Science, p. 32 (May 2000).
Whiting & Pascoe, "A History of Data-Flow Languages," IEEE Annals of the History of Computing 16(4):38-59 (1994).
Williamson & Lee, "Synthesis of Parallel Hardware Implementations from SynchronoDataflow Graph Specifications," Conference Record of the Thirtieth Asilomar Conference on Signals, Systems and Computers 1340-1343 (Nov. 1996).
Wirthlin et al., "A Dynamic Instruction Set Computer," Proceedings of the IEEE Symposium on FPGA's for Custom Computing Machines, pp. 99-107 (Apr. 21, 1995).
www.appliancemagazine.com, World Wide Web at http://web.archive.org/web/20000511085402/http://www.appliancemagazine.com/ printed on Apr. 30, 2008.
www.bestrom.com, BreakMateTM from www.bestrom.com printed on Apr. 29, 2008.
www.beverageexpress.com, Beverage Express from www.beverageexpress.com printed on Apr. 30, 2008.
www.bevstar.com, Isoworth Beverage Dispensing Technology Worldwide from www.bevstar.com printed on Apr. 30, 2008.
www.bonator.com, from the World Wide Web at http://web.archive.org/web/20000510102440/http://www.bonator.com/ printed on Apr. 30, 2008.
www.ecommerce.dewpointinc.com, Swiss Mountain Coffees from www.ecommerce.dewpointinc.com printed on Apr. 30, 2008.
www.gateway.com, World Wide Web, http://web.archive.org/web/20000229192734/www.gateway.com/productpages/9300splash/index.shtml Available on Mar. 3, 2000, 1 page (Mar. 3, 2000).
www.icl.com, from the World Wide Web at http://www.icl.com printed on Apr. 30, 2008.
www.margherita2000.com; from Margherita2000.com printed Apr. 30, 2008 (Jan. 26, 2001).
www.sodaclubenterprises.com, Soda-Club Enterprises from www.sodaclubenterprises.com printed on Apr. 30, 2008.
www.symbol.com, Symbol from www.symbol.com printed on Apr. 30, 2008.
www.wunderbar.com, Wunder-Bar Dispensing Systems from www.wunderbar.com printed on Apr. 30, 2008.
Xilinx, "Virtex-II Pro Platform FPGAs: Functional Description DS083-2 (v2.5)," Product Specification, pp. 13-46 (Jan. 20, 2003).
Young, "Architecture Powers up IPSec, SSL," EETimes, Los Gatos, CA, pp. 1-4 http://www.eetimes.com/story/OEG20011102S0065 (Nov. 2, 2001).
Yuan et al., "A Decomposition Approach to Non-Preemptive Real-Time Scheduling," Real Time Systems 6(1):7-35 (1994).
Zaino et al., "Algorithm Analysis and Mapping Environment for Adaptive Computing Systems," Final Technical Report, DARPA Contract F33615-97-C-1174 (Sep. 2001).
Zhang et al., "A 1V HeterogeneoReconfigurable Processor IC for Baseband Wireless Applications," 2000 IEEE Solid.

\* cited by examiner

32 ENTRY BY 20 BIT OUTPUT PORT NUMBER TO PHYSICAL ADDRESS TRANSLATION LUT

| ADDRESS | CONTENTS |
|---|---|
| 4 0 | 19 0 |
| PORT NUMBER | BUFFER PHYSICAL ADDRESS (17:2) |

| BUFFER SIZE | | BYTES |
|---|---|---|
| CODE | | |
| 0 0 0 0 0 | | 1. LONGWORD |
| 0 0 0 0 1 | | 4 |
| 0 0 0 1 0 | | 8 |
| 0 0 0 1 1 | | 16 |
| 0 0 1 0 0 | | 32 |
| 0 0 1 0 1 | | 64 |
| 0 0 1 1 0 | | 128 |
| 0 0 1 1 1 | | 256 |
| 0 1 0 0 0 | | 512 |
| 0 1 0 0 1 | | 1024 |
| 0 1 0 1 0 | | 2048 |
| 0 1 0 1 1 | | 4096 |
| 0 1 1 0 0 | | 8192 |
| 0 1 1 0 1 | | 16384 |
| 0 1 1 1 0 | | 32768 |
| 0 1 1 1 1 | | 65536 |
| 1 0 0 0 0 | | 131072 MAXIMUM BUFFER SIZE |

32 ENTRY -BY 6-BIT STATE INFORMATION TABLE

| ADDRESS | CONTENTS |
|---|---|
| 0 | |
| ⋮ | TASK NUMBER |
| 4 | |

| 5 | 4 | 3 | 0 |
|---|---|---|---|
| GO BIT | STATE | PORTS_COUNTER | |

FIG. 8

| 15 | 14 | 13 | 12 | 11 | 10 | 9 | 5 | 4 | 0 |
|---|---|---|---|---|---|---|---|---|---|
| ENB | ABT | RSV | WPE | RPE | QMT | QUEUE WRITE POINTER | | QUEUE READ POINTER | |

FIG. 9

| 15 | 14 | 13 | 12 | 11 | 5 | 4 | 0 |
|---|---|---|---|---|---|---|---|
| ENB | ABT | TCS | NRS | RESERVED | | CURRENT TASK NUMBER | |

| 31 | 28 | 24 23 | 20 19 | 15 14 | 0 |
|---|---|---|---|---|---|
| R | IN_PORT# | SIZE | | PHYSICAL MEMORY BYTE ADDRESS | |
| PRODUCER | | | | BWDACKVAL | |
| NODE# | | OUT_PORT# | TASK# | | |
| PARAMETERS FOR EACH OF UP TO FOUR READ BUFFERS | | | | | |

| 31 | 28 | 24 23 | 20 19 | 15 14 | 0 |
|---|---|---|---|---|---|
| R | OUT_PORT# | SIZE | | PHYSICAL MEMORY BYTE ADDRESS | |
| CONSUMER | | | | FWDACKVAL | |
| NODE# | | IN_PORT# | TASK# | | |
| PARAMETERS FOR EACH OF UP TO FOUR WRITE BUFFERS | | | | | |

*FIG. 14*

HARDWARE TASK MANAGER

CLAIM OF PRIORITY

This application is a continuation application of U.S. application Ser. No. 13/493,216 filed on Jun. 11, 2012, which is a continuation of U.S. application Ser. No. 12/367,690 filed on Feb. 9, 2009, now U.S. Pat. No. 8,200,799 which is a continuation of U.S. application Ser. No. 10/443,501 filed on May 21, 2003, now U.S. Pat. No. 7,653,710, which claims priority from U.S. Provisional Patent Application No. 60/391,874, filed on Jun. 25, 2002 entitled "DIGITAL PROCESSING ARCHITECTURE FOR AN ADAPTIVE COMPUTING MACHINE"; the disclosures of which are hereby incorporated by reference as if set forth in full in this document for all purposes.

CROSS-REFERENCE TO RELATED APPLICATIONS

This application is related to U.S. patent application Ser. No. 09/815,122, filed on Mar. 22, 2001, entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS"; U.S. patent application Ser. No. 10/443,596, filed on May 21, 2003, entitled, "PROCESSING ARCHITECTURE FOR A RECONFIGURABLE ARITHMETIC NODE IN AN ADAPTIVE COMPUTING SYSTEM"; and U.S. patent application Ser. No. 10/443,554 filed on May 21, 2003, entitled, "UNIFORM INTERFACE FOR A FUNCTIONAL NODE IN AN ADAPTIVE COMPUTING ENGINE".

BACKGROUND

This invention relates in general to digital data processing and more specifically to an interconnection facility for transferring digital information among components in an adaptive computing architecture.

A common limitation to processing performance in a digital system is the efficiency and speed of transferring instruction, data and other information among different components and subsystems within the digital system. For example, the bus speed in a general-purpose Von Neumann architecture dictates how fast data can be transferred between the processor and memory and, as a result, places a limit on the computing performance (e.g., million instructions per second (MIPS), floating-point operations per second (FLOPS), etc.).

Other types of computer architecture design, such as multi-processor or parallel processor designs require complex communication, or interconnection, capabilities so that each of the different processors can communicate with other processors, with multiple memory devices, input/output (I/O) ports, etc. With today's complex processor system designs, the importance of an efficient and fast interconnection facility rises dramatically. However, such facilities are difficult to design to optimize goals of speed, flexibility and simplicity of design.

SUMMARY OF THE INVENTION

A hardware task manager indicates when input and output buffer resources are sufficient to allow a task to execute. The task can require an arbitrary number of input values from one or more other (or the same) tasks. Likewise, a number of output buffers must also be available before the task can start to execute and store results in the output buffers.

The hardware task manager maintains a counter in association with each input and output buffer. For input buffers, a negative value for the counter means that there is no data in the buffer and, hence, the respective input buffer is not ready or available. Thus, the associated task can not run. Predetermined numbers of bytes, or "units," are stored into the input buffer and an associated counter is incremented. When the counter value transitions from a negative value to a zero the high-order bit of the counter is cleared, thereby indicating the input buffer has sufficient data and is available to be processed by a task.

Analogously, a counter is maintained in association with each output buffer. A negative value for an output buffer means that the output buffer is available to receive data. When the high-order bit of an output buffer counter is set then data can be written to the associated output buffer and the task can run.

Ports counters are used to aggregate buffer counter indications by tracking the high-order bit transitions of the counters. For example, if a task needs 10 input buffers and 20 output buffers then an input ports counter is initialized and maintained by tracking availability of the 10 allocated input buffers and 20 output buffers using simple increments and decrements according to high-order transitions of the buffer counter bits. When the high-order bit (i.e., the sign bit) of the ports counter transitions from a 1 to a 0, the associated task is ready to run.

In one embodiment the invention provides an apparatus for coordinating buffer use among tasks in a processing system, wherein the processing system includes a plurality of hardware nodes, wherein a task is executed on one or more of the hardware nodes, wherein a consuming task uses input buffers to obtain data and wherein a producing task uses output buffers to provide data, the apparatus comprising a task manager for indicating the status of the buffers, the task manager including an output buffer available indicator associated with an output buffer; an input buffer available indicator associated with an input buffer; and a status indicator for indicating that a task is ready to run based on a combination of the output buffer available indicator and the input buffer available indicator.

BRIEF DESCRIPTION OF THE DRAWINGS

FIG. 4 shows buffer size encoding;

FIG. 7 shows a table format for task state information;

FIG. 8 illustrates a data format for a node control register;

FIG. 9 shows the layout for a node status register;

FIG. 14 shows an example of packing eight parameters associated with task buffers;

DETAILED DESCRIPTION OF THE PREFERRED EMBODIMENT

A detailed description of an ACE architecture used in a preferred embodiment is provided in the patents referenced above. The following section provides a summary of the ACE architecture described in the referenced patents.

Adaptive Computing Engine

Figure 16:
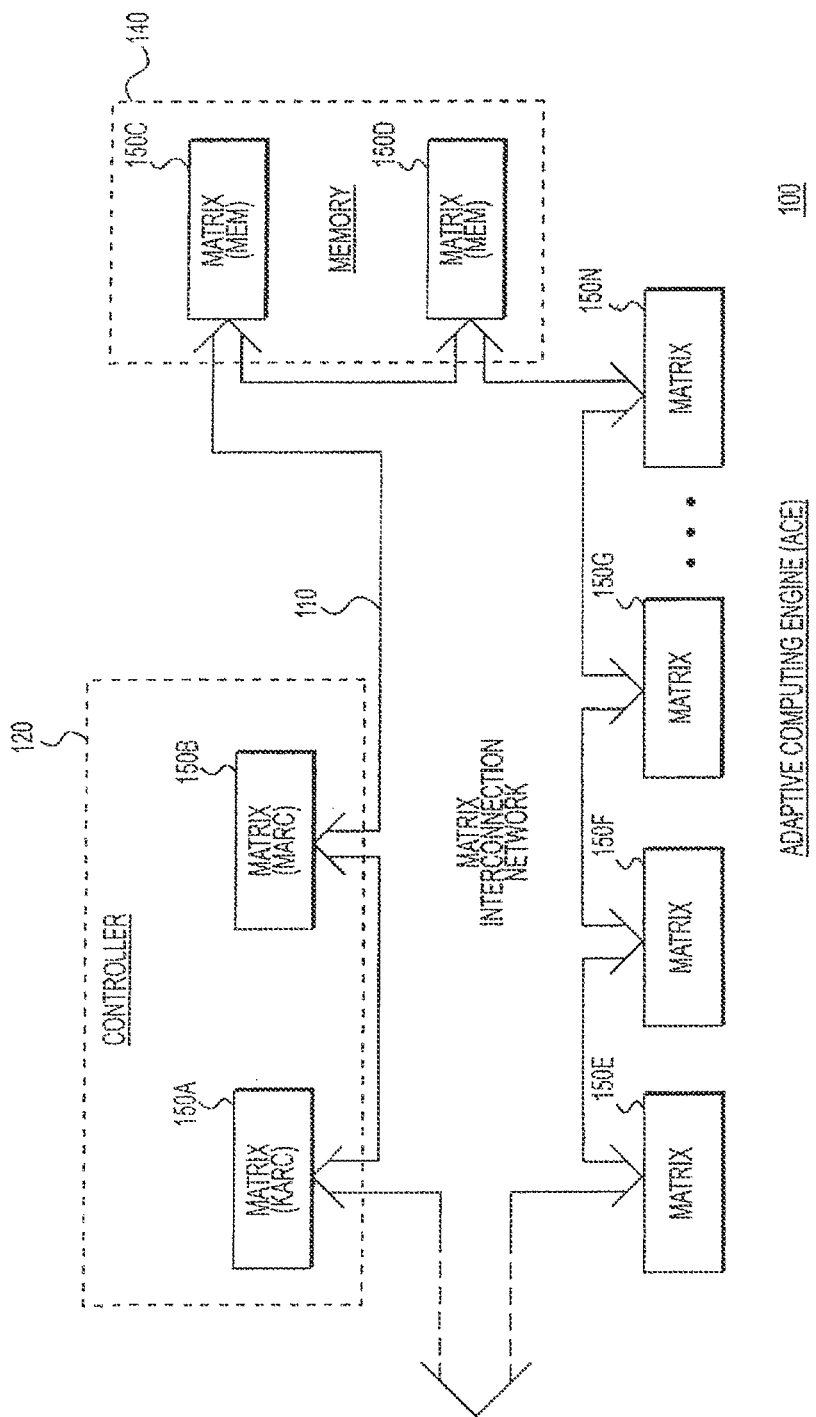
FIG. 16 shows an overview of an adaptable computing engine architecture.

FIG. 16 is a block diagram illustrating an exemplary embodiment in accordance with the present invention. Apparatus 100, referred to herein as an adaptive computing engine (ACE) 100, is preferably embodied as an integrated circuit, or as a portion of an integrated circuit having other, additional components. In the exemplary embodiment, and as discussed in greater detail below, the ACE 100 includes one or more reconfigurable matrices (or nodes) 150, such as matrices 150A through 150N as illustrated, and a matrix interconnection network 110. Also in the exemplary embodiment, and as discussed in detail below, one or more of the matrices 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

In a preferred embodiment, the ACE 100 does not utilize traditional (and typically separate) data, DMA, random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, in real-time, to provide any given connection between and among the reconfigurable matrices 150, including those matrices 150 configured as the controller 120 and the memory 140.

The matrices 150 configured to function as memory 140 may be implemented in any desired or exemplary way, utilizing computational elements (discussed below) of fixed memory elements, and may be included within the ACE 100 or incorporated within another IC or portion of an IC. In the exemplary embodiment, the memory 140 is included within the ACE 100, and preferably is comprised of computational elements which are low power consumption random access memory (RAM), but also may be comprised of computational elements of any other form of memory, such as flash, DRAM, SRAM, MRAM, ROM, EPROM or E2PROM. In the exemplary embodiment, the memory 140 preferably includes direct memory access (DMA) engines, not separately illustrated.

The controller 120 is preferably implemented, using matrices 150A and 150B configured as adaptive finite state machines (FSMs), as a reduced instruction set ("RISC") processor, controller or other device or IC capable of performing the two types of functionality discussed below. (Alternatively, these functions may be implemented utilizing a conventional RISC or other processor.) The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the exemplary form of combined data, configuration and control information referred to herein as a "silverware" module.

The matrix interconnection network 110 of FIG. 16, includes subset interconnection networks (not shown). These can include a boolean interconnection network, data interconnection network, and other networks or interconnection schemes collectively and generally referred to herein as "interconnect", "interconnection(s)" or "interconnection network(s)," or "networks," and may be implemented generally as known in the art, such as utilizing FPGA interconnection networks or switching fabrics, albeit in a considerably more varied fashion. In the exemplary embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166, and also as discussed below and as illustrated with reference to FIGS. 7, 8 and 9. These various interconnection networks provide selectable (or switchable) connections between and among the controller 120, the memory 140, the various matrices 150, and the computational units (or "nodes") and computational elements, providing the physical basis for the configuration and reconfiguration referred to herein, in response to and under the control of configuration signaling generally referred to herein as "configuration information". In addition, the various interconnection networks (110, 210, 240 and 220) provide selectable or switchable data, input, output, control and configuration paths, between and among the controller 120, the memory 140, the various matrices 150, and the computational units, components and elements, in lieu of any form of traditional or separate input/output busses, data busses, DMA, RAM, configuration and instruction busses.

It should be pointed out, however, that while any given switching or selecting operation of, or within, the various interconnection networks may be implemented as known in the art, the design and layout of the various interconnection networks, in accordance with the present invention, are new and novel, as discussed in greater detail below. For example, varying levels of interconnection are provided to correspond to the varying levels of the matrices, computational units, and elements. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix or computational unit, however, the interconnection network may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable nodes, or computational units; the nodes, in turn, generally contain a different or varied mix of fixed, application specific computational components and elements that may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110. Details of the ACE architecture can be found in the related patent applications, referenced above.

Hardware Task Manager

Figure 1:
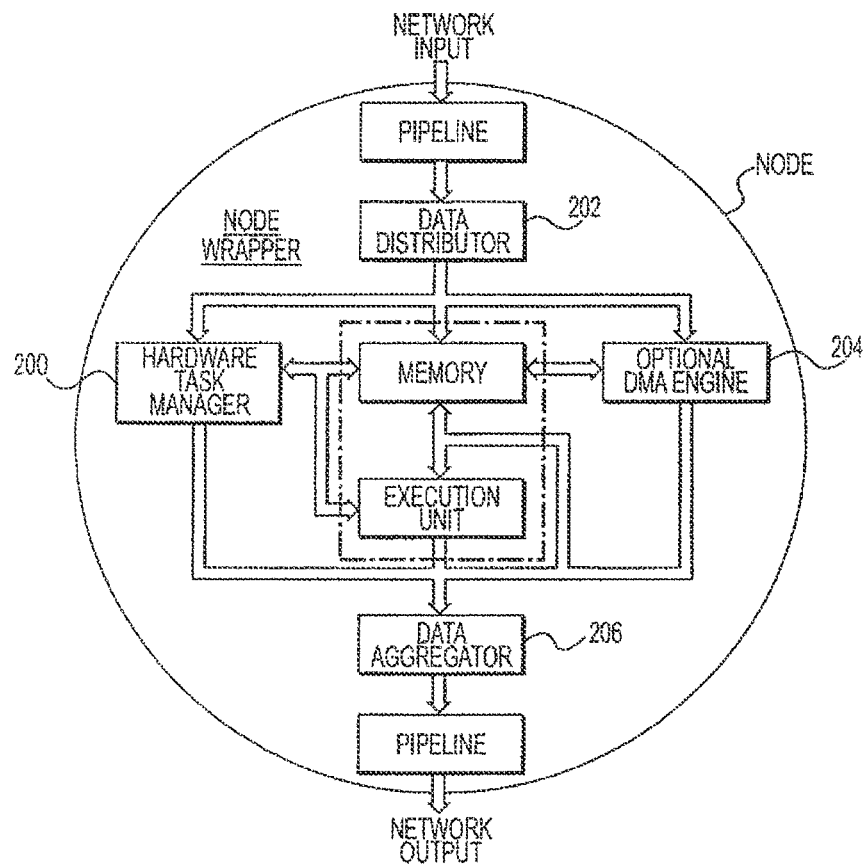
FIG. 1 illustrates the interface between heterogeneous nodes and the homogenous network in the ACE architecture.

FIG. 1 illustrates the interface between heterogeneous nodes and the homogenous network in the ACE architecture. This interface is referred to as a "node wrapper" since it is used to provide a common input and output mechanism for each node. A node's execution units and memory are interfaced with the network and with control software via the node wrapper to provide a uniform, consistent system-level programming model. Details of the node wrapper can be found in the related patent applications referenced, above.

In a preferred embodiment, each node wrapper includes a hardware task manager (HTM) 200. Node wrappers also include data distributor 202, optional direct memory access (DMA) engine 204 and data aggregator 206. The HTM coordinates execution, or use, of node processors and resources, respectively. The HTM does this by processing a task list and producing a ready-to-run queue. The HTM is configured and controlled by a specialized node referred to as a K-node or control node (not shown). However, other embodiment can use other HTM control approaches.

A task is an instance of a module, or group of instructions. A module can be any definition of processing, functionality or resource access to be provided by one or more nodes. A task is associated with a specific module on a specific node. A task definition includes designation of resources such as "physical" memory and "logical" input and output buffers and "logical" input and output ports of the module; and by initializing configuration parameters for the task. A task has four states: Suspend, Idle, Ready, Run.

A task is created by the K-node writing to control registers in the node where the task is being created, and by the K-node writing to control registers in other nodes, if any, that will be producing data for the task and/or consuming data from the task. These registers are memory mapped into the K-node's address space, and "peek and poke" network services are used to read and write these values.

A newly created task starts in the suspend state. Once a task is configured, the K-node can issue a "go" command, setting a bit in a control register. The action of this command is to move the task from the "suspend" state to the "idle" state.

When the task is "idle" and all its input buffers and output buffers are available, the task is ADDed to the ready-to-run queue which is implemented as a FIFO; and the task state is changed to "ready/run".

Note: Buffers are available to the task when subsequent task execution will not consume more data than is present in its input buffer(s) or will not produce more data that there is capacity in its output buffer(s).

When the execution unit is not busy and the FIFO is not empty, the task number for the next task that is ready to execute is REMOVEd from the FIFO, and the state of this task is "run". In the "run" state, the task consumes data from its input buffers and produces data for its output buffers. For PDU, RAU and RBU unit types, only one task can be in the "run" state at a time, and the current task cannot be preempted. These restrictions are imposed to simplify hardware and software control.

When the task completes processing:
1) if the task's GO bit is zero, its state will be set to SUSPEND; or
2) if (its GO bit is one) AND (its PORTS_COUNTER msb is one), its state will be set to idle; or
3) if (its GO bit is one) AND (the FIFO is not empty) AND (its PORTS_COUNTER msb is zero) the task will be ADDed to the ready-to-run queue and its state will be "ready"; or
4) if (its GO bit is one) AND (the FIFO is empty) AND (its PORTS_COUNTER msb is zero), its state will remain "run"; the task will execute again since its status is favorable and there is no other task waiting to run.

The K-node can clear the task's GO bit at any time. When the task reaches the "idle" state and its GO bit is zero, its state will transition to "suspend".

The K-node can determine if a task is hung in a loop by setting and testing status. When the K-node wishes to stop a run-away task, it should clear the task's GO bit and issue the "abort" command to reset the task's control unit. After reset, the task's state will transition to "idle". And, if its GO bit has been cleared, its state will transition to "suspend".

Task Lists

A node has a task list, and each task is identified by its "task number". Associated with each task are the following:

Task_number [4:0]—The task number, in the range of 0 to 31.

State [1:0] with values:
'00'=suspended
'01'=idle
'10'=ready
'11'=run

Go_bit with values:
0=stop
1=go

Module—Pointer to the module used to implement this task. For reconfigurable hardware modules, this may be a number that corresponds to a specific module. For the PDU, this is the instruction memory address where the module begins.

Ports_counter—The negative number of input ports and output ports that must be available before the task state can transition from "idle" to "ready". For example, an initial value of −3 might indicate that two input ports and one output port must be available before the task state changes to "ready". When a port changes from "unavailable" to "available", Ports_counter is incremented by one. When a port changes from "available" to "unavailable", Ports_counter is decremented by one. When the value for Ports_counter reaches (or remains) zero and the task state is "idle", task state transitions to "ready". The sign (high-order) bit of this counter reflects the status of all input ports and output ports for this task. When it is set, not all ports are available; and when it is clear, then all ports are available, and task state transitions from "idle" to "ready".

Each task can have up to four input buffers. Associated with each input buffer are the following:

In port_number(0,1,2,3) [4:0]—a number in the range of 0 to 31.

Mem_hys_addr [k:0]—The physical address in memory of the input buffer.

Size [3:0]—a power-of-two coding for the size of the input buffer.

Consumer_count [15:0]—a two's complement count, with a range of −32768 to +32767, for input buffer status. It is initialized by the K-node, incremented by an amount Fwdackval by the upstream producer and incremented by an amount Negbwdackval by the consumer (this task). The sign (high-order) bit of this counter indicates input buffer status. When it is set (negative), the buffer is unavailable to this task; and when it is clear (non-negative), the buffer is available to this task.

Bwdackval [15:0]—the negative backward acknowledge value with a range of −32768 to 0.

Producer_task_number [4:0]—a number in the range of 0 to 31 indicating the producer's task number for counter maintenance, including backward acknowledgement messages to remote producers.

Producer_outport_number [4:0]—a number in the range of 0 to 31 indicating the producer's output port number for counter maintenance, including backward acknowledgement messages to remote producers.

Producer_node_number [6:0]—a number in the range of 0 to 127 indicating a remote producer's node number for routing backward acknowledgement messages to remote producers.

Each task can have up to four output buffers. Associated with each buffer is the following:

Out_port_number(0,1,2,3) [4:01]—a number in the range of 0 to 31.

Mem_phys_addr [k:0]—The physical address in memory of the output buffer, if local.

Size [3:0]—a power-of-two coding for the size of the output buffer, if local.

Producer_count [15:0]—a two's complement count, with a range of −32768 to +32767, for output buffer status. It is initialized by the K-node, incremented by an amount Fwdackval by the producer (this task) and incremented by an amount Negbwdackval by the downstream consumer. The sign (high-order) bit of this counter indicates output buffer status. When it is set (negative), the buffer is available to this task; and when it is clear (non-negative), the buffer is unavailable to this task.

Fwdackval [15:0]—the forward acknowledge value with a range of 0 to +32767.

Consumer_task_number [4:0]—a number in the range of 0 to 31 indicating the consumer's task number for counter maintenance, including forward acknowledgement messages to remote consumers.

Consumer_in_port_number [4:0]—a number in the range of 0 to 31 indicating the consumer's input port number for counter maintenance, including forward acknowledgement messages to remote consumers.

Consumer_node_number [6:0]—a number in the range of 0 to 127 indicating a remote consumer's node number for routing data and forward acknowledgement messages to remote consumers.

Parms_pointer [k:0]—The physical address in memory indicating the first of tbd entries containing the task's configuration parameters.

A preferred embodiment of the invention uses node task lists. Each list can designate up to 32 tasks. Each of the up to 32 tasks can have up to four input ports (read ports) and up to four output ports (write ports). A node can have 32 input ports and 32 output ports. 5-bit numbers are used to identify each port. Each number is associated with a 20-bit address in the contiguous address space for 1024 kilobytes of physical memory.

HTM Components

Figure 2:
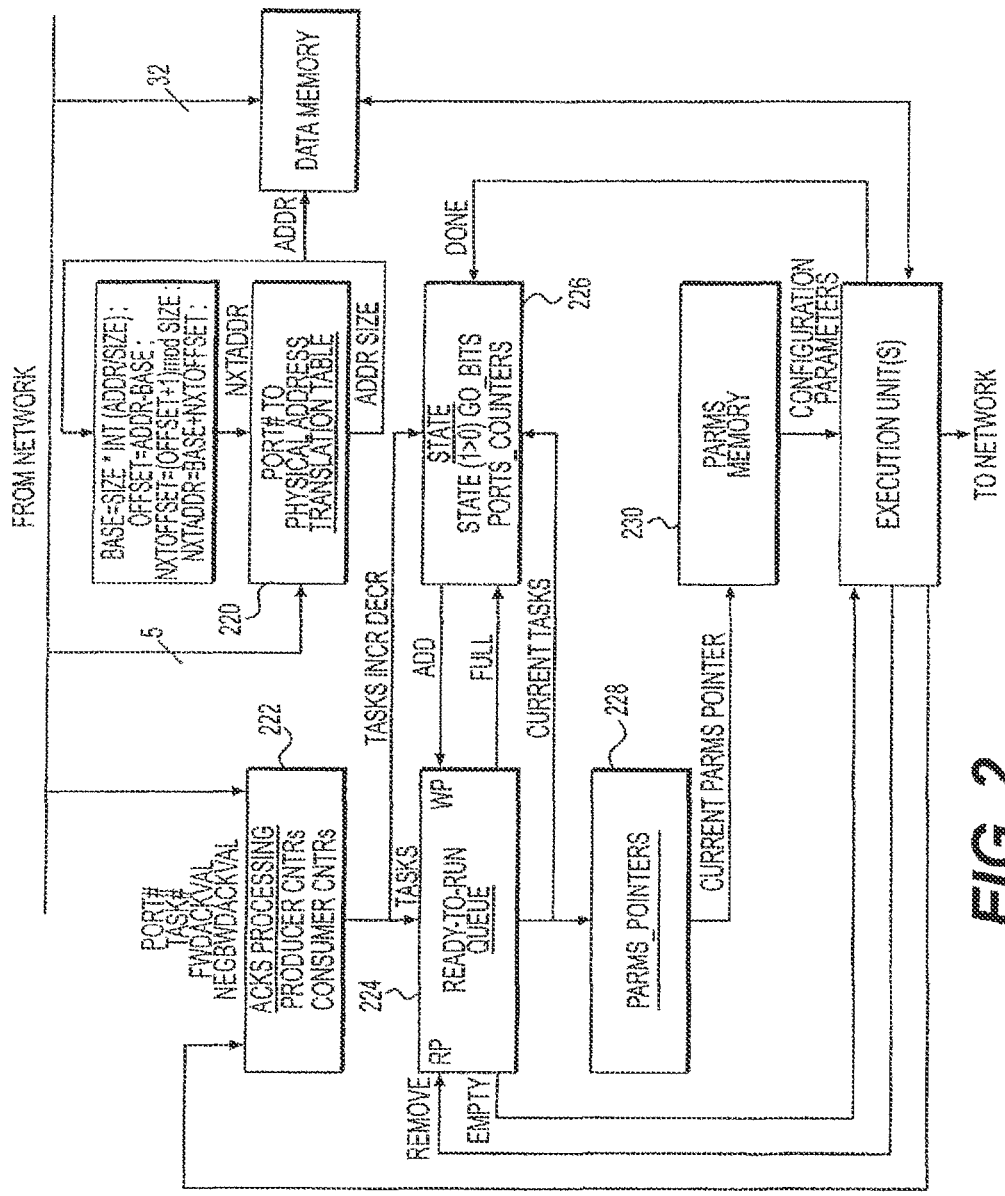
FIG. 2 illustrates basic components of a hardware task manager.

FIG. 2 illustrates basic components of an HTM. These include port-to-address translation table 220, ACKs processor 222, ready-to-run queue 224, state information 226, parameters pointers 228, and parameters memory 230.

Port-to-Address Translation Table

Under K-node control, the execution units in each node can write into any memory location in the 20-bit contiguous address space. Accessing permissions are controlled by the port number-to-physical address translation tables. There are 32 entries in the table to support up to 32 ports at each node's input.

Figure 3:
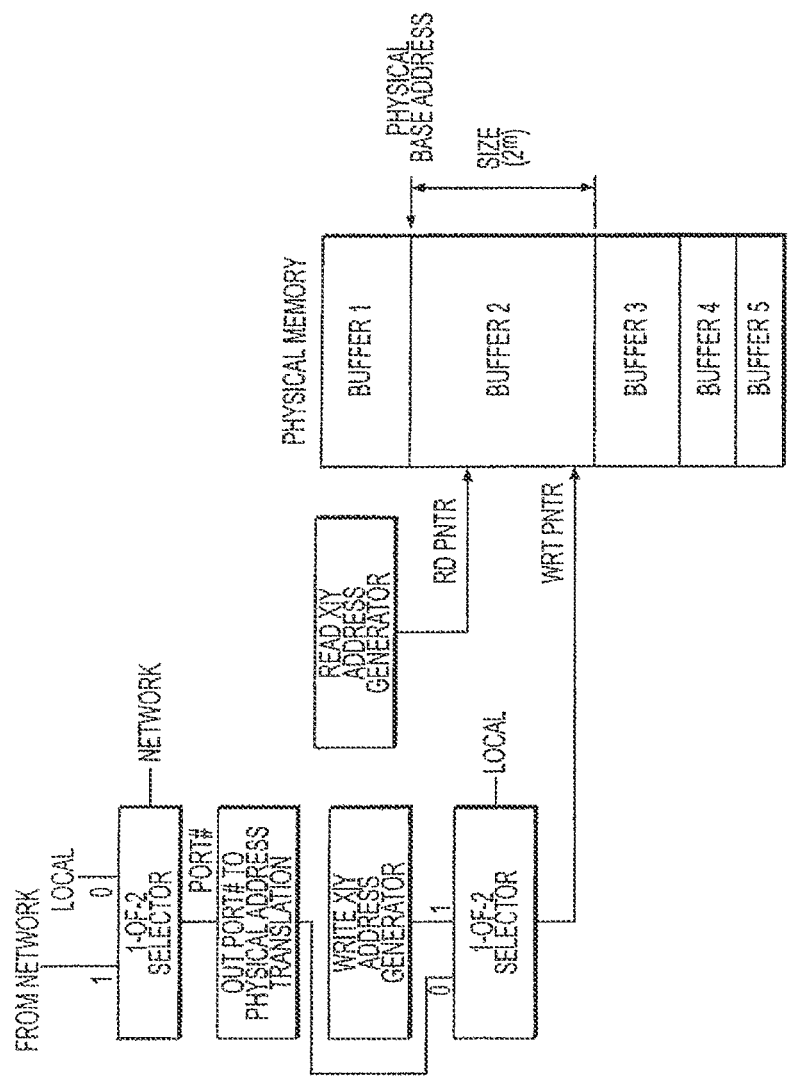
FIG. 3 shows buffers associated with ports.

Each of the 32 ports at each node's input can be assigned to an output port of any task executing on any node (including "this node") on the die. Each port number is associated with a "power-of-2" sized buffer within one or more of the node's physical memory blocks as shown in FIG. 3.

The 20-bit contiguous address space is accessible by a 6-bit node number (the six high order bits) and a 14-bit (low order bits) byte address for the 16 KBytes within a tile.

Because network transfers are 32-bit transfers, 16-bit longword addresses are stored in the translation tables, and the two lower order address bits are inferred (and set to '00' by each memory's address mux). The power-of-two buffer size is encoded in a four-bit value for each entry in the table as shown in FIG. 4.

The translation table is loaded/updated by the K-node. When a task writes to this node, its output port number is used to access the table. Its accompanying data is written into the current address [ADDR] that is stored in the table, and the next address [NXTADDR] is calculated as follows:

BASE=SIZE*INT {ADDR/SIZE}

OFFSET=ADDR-BASE

NXTOFFSET=(VAL+1) mod SIZE

NXTADDR=BASE+NXTOFFSET

ACKs Processor

Tasks communicate through buffers. Buffers are accessed via port numbers. Each active buffer is associated with a producer task and a consumer task. Each task maintains a count reflecting the amount of data in the buffer. As the producer writes data into the buffer, it updates its producer_counter with a value, Fwdackval, equal to the number of bytes that it has produced (written). It also updates the corresponding Consumer_count, using a FWDACK message if the consumer is remote (not in its node).

When the consumer reads, and no longer requires access to, data in the buffer, it updates its Consumer_count with a value, Bwdackval, equal to minus the number of bytes that is has consumed. It also updates the corresponding Producer_count, using a BWDACK message if the producer is remote.

Figure 15:
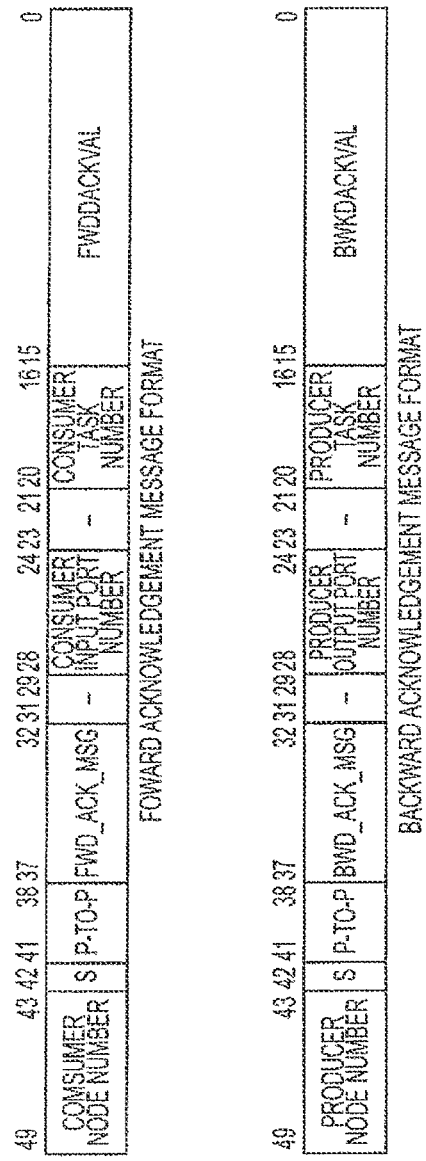
FIG. 15 shows data formats for the Forward and Backward Acknowledgement Messages.

Note: Data formats for the Forward and Backward Acknowledgement Messages are shown in FIG. 15.

Figures 5, 6:
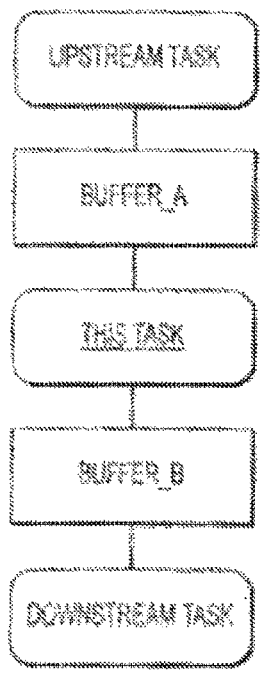
FIG. 5 shows a look-up table format.
FIG. 6 shows counter operations.

The ACKs processor includes a 64-entry by 16-bit LUT to store counts for each of its (up to) 32 input ports and 32 output ports. The format for this LUT is shown in FIG. 5.

The counters are initialized with negative values by the K-node. Producer counters are accessed by their associated output port numbers; consumer counters are accessed by their associated input port numbers.

Producer counters are incremented by Fwdackvals from their associated tasks, and they are incremented by Bwdackvals from the downstream tasks that consume the data.

Consumer counters are incremented by Bwdackvals from their associated tasks, and they are incremented by Fwdackvals from the upstream tasks that produce the data.

Note that incrementing by a Bwdackval, a negative value, is equivalent to decrementing by a positive value, producing a more negative result.

These operations are summarized in FIG. 6. In FIG. 6, an upstream task is the producer (writer) of Buffer A. One of the upstream task's output port numbers is associated with Buffer A and its producer counter. The producer counter is incremented by the upstream task's Fwdackval, and it is incremented by this task's Bwdackval. In FIG. 6, this task is the consumer (reader) of Buffer A. One of this task's input port numbers is associated with Buffer A and its consumer counter. The consumer counter is incremented by the upstream task's Fwdackval and it is incremented by this task's Bwdackval. In FIG. 6, this task is the producer (writer) of Buffer B. One of this task's output port numbers is associated with Buffer B and its producer counter. The producer counter is incremented by this task's Fwdackval and it is incremented by the downstream task's Bwdackval. In FIG. 6, a downstream task is the consumer (reader) of Buffer B. One of the downstream task's input port numbers is associated with Buffer B and its consumer counter. The consumer counter is incremented by this task's Fwdackval and it is incremented by the downstream task's Bwdackval.

An input buffer is available to its associated task when the high order bit of its consumer counter is clear, indicating a non-negative count. An input buffer is not available to its associated task when the bit is set, indicating a negative count. Consumer counters are initialized (by the K-node) with the negative number of bytes that must be in its input buffer before the associated task can execute. When the high order bit is clear, indicating buffer availability, the task is assured that the data it will consume during its execution is in the buffer.

An output buffer is available to its associated task when the high order bit of its producer counter is set, indicating a negative count. An output buffer is not available to its associated task when the bit is clear, indicating a non-negative count. Producer counters are initialized (by the K-node) with a negative number of bytes that it can produce before it must suspend task execution. An available output buffer indication assures the task that there is sufficient buffer capacity for execution with no possibility of overflow.

The initial values for these counters are functions of Ackvals and the desired numbers of task execution iterations after initialization.

To avoid deadlocks, the minimum buffer size must be the next power of two that exceeds the sum of the maximum absolute values of Fwdackvals and Bwdackvals. For example, for Fwdackval=51 and Bwdackval=−80, the buffer size must be greater than, or equal to, 256.

Counters are updated when ACKVAL messages arrive from the network and from locally executing tasks. When the high order bits of the current count and the updated count are different, a change of status indication is generated along with the associated task number, so that its STATE Ports_counter can be incremented or decremented. For input ports, the ports_counter is decremented for 0-to-1 transitions, and it is incremented for 1-to-0 transitions. For output ports, the ports_counter is incremented for 0-to-1 transitions, and it is decremented for 1-to-0 transitions.

When the high order bit of the Ports_counter transitions from 1 to 0, the associated task is ready to run; and it is ADDed to the Ready-to-Run Queue. Also, when the current task completes and its ACKs have been processed, if its GO bit is zero, its STATE is set to SUSPEND. Else, if its Ports_counter msb is clear, it is ready to run again; and, if the FIFO is empty, it runs again; or, if the FIFO is not empty, it is ADDed to the queue. Finally, if its GO bit is one, but its Ports_counter msb is clear, its STATE is set to IDLE; and it must wait for the next Ports_counter msb transition from 1 to 0 before it is once again ready to run and ADDed to the queue.

Ready-to-Run Queue

The Ready-to-Run Queue is a 32-entry by 5 bits per entry FIFO that stores the task numbers of all tasks that are ready to run. The K-node initializes the FIFO by setting its 5-bit write pointer (WP) and its 5-bit read pointer (RP) to zero. Initialization also sets the fifo status indication: EMPTY=1.

When a task is ready to run, its task number is ADDed to the queue at the location indicated by WP, and WP is incremented. For every ADD, EMPTY is set to 0.

When the execution unit is idle and the FIFO is not empty (EMPTY=0), the task number for the next task to be executed is REMOVEd from the queue at the location indicated by RP. When the task is completed, RP is incremented. And, if RP=WP, EMPTY is set to 1.

The FIFO is FULL when [(RP=WP) AND (EMPTY=0)].

State Information Table

State information for each of (up to) 32 tasks is maintained in a 32-entry by 6 bit table that is accessed by one of 32 task numbers. The format for this table is shown in FIG. 7.

The State Information Table is initialized by the K-node (POKE). The K-node also can monitor the state of any task (PEEK). In addition to the K-node's unlimited access to the table, other accesses to it are controlled by a FSM that receives inputs from the ACKs Processor, the Ready-to-Run Queue, and the Execution Unit as shown in FIG. 8. Details of this FSM are beyond the scope of this paper.

Parms Pointers

Associated with each task is a register that contains the physical address where the first of the task's configuration parameters is stored in a contiguous chunk of memory.

Parms Memory

Each task's configuration parameters—or Module Parameter List (MPL),—are stored in a contiguous chunk of memory referenced by the task's Parms Pointer. The numbers of parameters and their purposes will vary from one task to another. As tasks are designed, their specific requirements for configuration parameters will be determined and documented.

Typically, these requirements will include:

Module—Pointer to the module used to implement this task. For reconfigurable hardware modules, this may be a number that corresponds to a specific module. For the PDU, this is the instruction memory address where the module begins.

For each of up to four buffers from which the task will consume (read) data:

Memory Physical Address
Buffer Size
Input Port Number
Producer Task Number
Producer Output Port Number
Producer Node Number (if remote)
Producer (Local/Remote); boolean
Bwdackval For each of up to four buffers into which the task will produce (write) data:

Memory Physical Address (if local)
Buffer Size (if local)

Output Port Number
Consumer Task Number
Consumer Input Port Number
Consumer Node Number (if remote)
Consumer (Local/Remote); boolean
Fwdackval
For each presettable counter (for example: number of iterations count; watchdog count)
(Counter Modulus-1)

Node Control Register (NCR)

The layout for the Node Control Register is shown in FIG. 8.

ENB—Bit 15—When the NCR Enable bit is clear, the node ceases all operation, except that it continues to support PEEK and POKE operations. The NCR Enable bit must be set to 1 to enable any other node functions.

ABT—Bit 14—Writing (POKING) the NCR with Bit 14 set to 1 generates an Abort signal to the execution unit, causing it to halt immediately, The state of the aborted task transitions to IDLE; and if its GO bit has been cleared (as it should be prior to issuing the Abort), the state will transition to SUSPEND. This is the K-node's sledge hammer to terminate a runaway task. Writing the NCR with Bit 14=0 is no operation. When reading (PEEKING) NCR, zero will be returned for Bit 14.

RSV—Bit 13—At this time, Bit 13 is unused. When writing the NCR, Bit 13 is don't care, and when reading NCR, zero will be returned for Bit 13.

WPE—Bit 12—Writing the NCR with Bit 12 set to 1 results in the writing of the [9:5] value into Queue Write Pointer (with ENB=0, a diagnostics WRITE/READ/CHECK capability). Writing the NCR with Bit 12=0 is no operation. When reading NCR, zero will be returned for Bit 12.

RPE—Bit 11—Writing the NCR with Bit 11 set to 1 results in the writing of the NCR[4:0] value into Queue Read Pointer (with ENB=0, a diagnostics WRITE/READ/CHECK capability). Writing the NCR with Bit 11=0 is no operation. When reading NCR, zero will be returned for Bit 11.

Queue Initialization

Writing the NCR with Bits 12 and 11 set to 1 and with Bits [9:5] and Bits [4:0] set to zeros initializes the queue, setting the Write Pointer to zero, the Read Pointer to zero, and the Queue Empty Status Flag to 1.

Queue Empty Status Flag—Bit 10—READ ONLY Bit 10, the Queue Empty Status Flag, is set to 1 when the Ready-to-Run FIFO is empty; it is set to 0 when it is not empty. When Bit 10 is set to 1, the Write Pointer (NCR [9:5]) and Read Pointer (NCR [4:0]) values will be the same. When the pointer values are the same, and Bit 10=0, the FIFO is FULL. When writing NCR, Bit 10 is don't care.

Queue Write Pointer—Bits [9:5]—For diagnostics WRITE/READ/CHECK capability (and for queue initialization), writing NCR with Bit 12=1 results in the writing of the NCR[9:5] value into Queue Write Pointer. When writing NCR with Bit 12=0, Bits [9:5] are don't care. When reading NCR, Bits [9:5] indicate the current Queue Write Pointer value.

Queue Read Pointer—Bits [4:0]—For diagnostics WRITE/READ/CHECK capability (and for queue initialization), writing NCR with Bit 11=1 results in the writing of the NCR[4:0] value into Queue Read Pointer. When writing NCR with Bit 11=0, Bits [4:0] are don't care. When reading NCR, Bits [4:0] indicate the current Queue Read Pointer value.

Node Status Register (NSR)

The layout for the Node Status Register is shown in FIG. 9. The Node Status Register is a READ ONLY register. READING NSR clears Bits 14 and 13. WRITING NSR is no operation.

ENB—Bit 15—Bit 15, Enable, simply indicates the state of NCR [15]: Enable.

ABT—Bit 14—When an Abort command is issued (WRITE NCR, Bit 14=1), the executing task is suspended, after which the Abort Status Bit 14 is set to 1. Reading NSR clears Bit 14.

TCS—Bit 13—The Task Change Status Bit 13 is set to 1 when an execution unit REMOVEs a TASK # from the Ready-to-Run Queue. Reading NSR clears Bit 13. The K-node can perform a "watch dog" operation by reading NSR, which clears Bit 13, and reading NSR again after a time interval. After the second read, if Bit 13 is set to 1, another REMOVE (initiating execution of the next task) has occurred during the time interval. If Bit 13=0, another REMOVE has not occurred during the time interval.

NRS—Bit 12—This bit is set to 1 when the node is executing a task. When the bit=0, the node is not executing a task.

Reserved—Bits [11:5]—These bits are not assigned at this time, and reading the NSR results in zeros being returned for Bits [11:5]

Current Task Number—Bits [4:0]—Bits [4:0] is the 5-bit number (task number) associated with the task currently executing (if any).

Port/Memory Translation Table (PTT)

The layout for the 32-entry Port/Memory Translation Table (PTT) is shown in FIG. 4.

Producers Counters Table (PCT); Consumers Counters Table (CCT)

The layouts for the 32-entry Producers Counters Table (PCT) and the 32-entry Consumers Counters Table (CCT) are shown in FIG. 5.

Ready-to-Run Queue (RRQ)

Figure 10:
FIG. 10 shows the layout for a Port/Memory Translation Table.

The layout for the 32-entry Ready-to-Run Queue (RRQ) is shown in FIG. 10.

Reserved—Bits [15:5]—These bits are not assigned at this time, and reading the RRQ results in zeros being returned for Bits [15:5].

Task Number—Bits [4:0]—The K-node can PEEK/POKE the 32-entry by 5-bit table for diagnostics purposes.

State Information Table (SIT)

Figure 11:
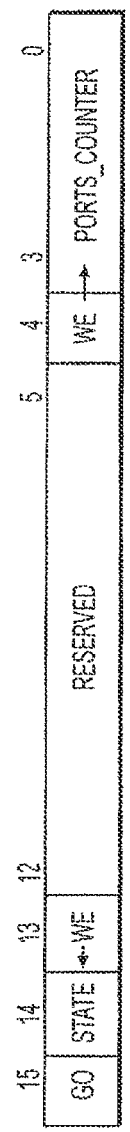
FIG. 11 shows a layout for a State Information Table.

The layout for the 32-entry State Information Table (SIT) is shown in FIG. 11. The 32-entry SIT is initialized by the K-node. This includes setting the initial value for the Ports_counter, the STATE_bit to zero, and the GO_bit=0. Thereafter, the K-node activates any of up to 32 tasks by setting its GO bit=1. The K-node de-activates any of up to 32 tasks by setting its GO_bit=0.

Prior to issuing an ABORT command, the K-node should clear the GO_bit of the task that is being aborted.

Bit 15, the GO_bit, is a READ/WRITE bit.

Bits [12:5] are unassigned at this time. For WRITE operations, they are don't care, and for READ operations, zeros will be returned for these fields.

When the SIT is written with Bit 13 (STATE Write Enable) set to 1, the STATE Bit for the associated task is set to the value indicated by Bit [14]. When Bit 13 is set to zero, there is no operation. For READ operations, the current STATE Bit for the associated task is returned for Bit [14], and a zero is returned for Bit 13.

When the SIT is written with Bit 4 (Ports_counter Write Enable) set to 1, the Ports_counter for the associated task is set to the value indicated by Bits [3:0]. When Bit 4 is set to zero, there is no operation. For READ operations, the current value of Ports_counter for the associated task is returned for Bits [3:0], and a zero is returned for Bit 4.

Figures 12, 13:
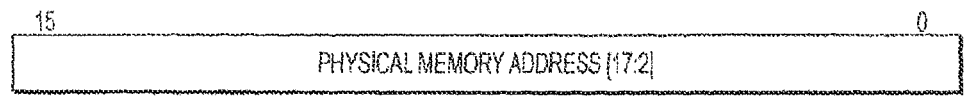
FIG. 12 shows a summary of state transitions for a task.
FIG. 13 shows a layout for the a Module Parameter List and Module Pointer Table.

State transitions for a task are summarized in the table shown in FIG. 12. Note that for each of the (up to) 32 tasks, the K-node can resolve merged READY/RUN status by comparing any of 32 task numbers with the current task number which is available in the Node Status Register, NSR[4:0].

MDL Pointer Table (MPT)

The layout for the 32-entry Module Parameter List (MPL) Pointer Table (MPT) is shown in FIG. 13. Associated with each task is a register that contains the physical address in a contiguous chunk of memory where the first of the task's tbd configuration parameters is stored.

Because there are unresolved issues associated with aggregating memories/tiles/tasks, we indicate a 16-bit memory pointer (assuming longword address boundaries) which would allow the task to access its configuration information from any memory within its quadrant.

Parms Memory Layouts

Each task's Module Parameter List (MPL) will be stored in a contiguous chunk of memory referenced by its associated Parms Pointer. The numbers of parameters and their purposes will vary from one task to another. As tasks are designed, their specific requirements for configuration parameters (and their associated layouts) will be determined and documented.

An example of packing eight parameters associated with each task buffer is shown in FIG. 14.

Forward/Backward Acknowledgement Message Formats

Data formats for the Forward and Backward Acknowledgement Messages are shown in FIG. 15.

Although the invention has been described with respect to specific embodiments, thereof, these embodiments are merely illustrative, and not restrictive of the invention. For example, any type of processing units, functional circuitry or collection of one or more units and/or resources such as memories, I/O elements, etc., can be included in a node. A node can be a simple register, or more complex, such as a digital signal processing system. Other types of networks or interconnection schemes than those described herein can be employed. It is possible that features or aspects of the present invention can be achieved in systems other than an adaptable system, such as described herein with respect to a preferred embodiment.

Thus, the scope of the invention is to be determined solely by the appended claims.

We claim:

1. An integrated circuit comprising:
   a plurality of computing nodes, at least one of the plurality computing nodes comprising an execution unit configured to execute tasks;
   an interconnection network operatively coupled to the plurality of computing nodes, the interconnection network configured to provide interconnections among the plurality of computing nodes; and
   a hardware task manager in at least one of the plurality of computing nodes, the hardware task manager managing execution of tasks by the execution unit.

2. The integrated circuit of claim 1, wherein the plurality of computing nodes comprise a plurality of heterogeneous computing nodes.

3. The integrated circuit of claim 1, wherein the hardware task manager is configured to process the tasks in a task list.

4. The integrated circuit of claim 1, wherein the hardware task manager is configured to maintain a state information table configured to provide the state of each task.

5. The integrated circuit of claim 1, wherein the hardware task manager is configured to provide a ports count for a created task to indicate the availability of input ports and output ports to the created task.

6. The integrated circuit of claim 5, wherein the availability is based on a predetermined amount of available data.

7. The integrated circuit of claim 1, wherein the at least one computing node further comprises a node wrapper, the node wrapper interfacing the execution unit to the interconnection network.

8. An integrated circuit comprising:
   a plurality of computing nodes, at least one computing node comprising an execution unit configured to execute tasks;
   an interconnection network operatively coupled to the plurality of computing nodes, the interconnection network configured to provide interconnections among the plurality of computing nodes;
   a hardware task manager in at least one of the plurality of computing nodes; and
   a ready-to-run queue in communication with the hardware task manager and configured to identify tasks that are ready to be executed by the execution unit.

9. The integrated circuit of claim 8, wherein a task is identified as one of a plurality of states, the plurality of states selected from the group consisting of:
   a suspend state identifying tasks created by a control node;
   an idle state identifying tasks that are not ready for execution;
   a ready state identifying tasks that are ready for execution; and
   a run state identifying tasks that are being executed by the execution unit.

10. The integrated circuit of claim 8, wherein a task is added to the ready-to-run queue when a task is identified as the ready state by the hardware task manager.

11. The integrated circuit of claim 8, wherein the hardware task manager is configured to communicate with the execution unit to execute a task when the execution unit is idle and the task is the next task in the ready-to-run queue.

12. The integrated circuit of claim 8, wherein the hardware task manager is further configured to determine a status of at least one buffer associated with a task and identify a task as ready to run based on the status of the at least one buffer.

13. The integrated circuit of claim 12, wherein the at least one buffer comprises at least one input buffer and at least one output buffer.

14. The integrated circuit of claim 8, wherein the hardware task manager is configured to identify the task as ready to run when the at least one input buffer and the at least one output buffer associated with the task are available.

15. The integrated circuit of claim 14, wherein the hardware task manager is configured to determine the status of the at least one buffer using a buffer counter.

16. The integrated circuit of claim 15, wherein the buffer counter is changed when a unit of data is placed into at least one buffer and when a unit of data is removed from the at least one buffer.

17. The integrated circuit of claim 8, wherein each task is associated with a task identifier, and wherein the ready-to-run queue is configured to identify tasks in the ready-to-run queue with the task identifier.

\* \* \* \* \*